United States Patent
Zhao

(10) Patent No.: US 8,914,161 B2
(45) Date of Patent: Dec. 16, 2014

(54) POWER SUPPLY CONTROL DEVICE AND VENTILATING DEVICE USING SAME

(75) Inventor: Yong Zhao, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 689 days.

(21) Appl. No.: 13/210,397

(22) Filed: Aug. 16, 2011

(65) Prior Publication Data

US 2011/0301775 A1   Dec. 8, 2011

Related U.S. Application Data

(63) Continuation of application No. PCT/CN2010/070236, filed on Jan. 18, 2010.

(30) Foreign Application Priority Data

Feb. 23, 2009   (CN) .................. 2009 2 0051892 U

(51) Int. Cl.
*G05D 7/06* (2006.01)
*H02J 9/00* (2006.01)
*H02J 9/06* (2006.01)

(52) U.S. Cl.
CPC . *H02J 9/061* (2013.01); *Y02B 10/72* (2013.01)
USPC ........................................ 700/297; 700/295

(58) Field of Classification Search
CPC .............................. H02J 9/061; Y02B 10/72
USPC ................ 700/295, 275, 276, 286, 297, 298; 307/64
See application file for complete search history.

(56) References Cited

U.S. PATENT DOCUMENTS

| | | | | |
|---|---|---|---|---|
| 4,445,049 A * | 4/1984 | Steigerwald | | 307/45 |
| 4,489,243 A * | 12/1984 | Nola | | 307/64 |
| 5,851,309 A * | 12/1998 | Kousa | | 136/248 |
| 6,570,270 B2 * | 5/2003 | Takebayashi | | 307/81 |
| 6,743,357 B2 * | 6/2004 | Keeton, Jr. | | 210/220 |
| 6,792,938 B2 * | 9/2004 | Komano et al. | | 126/597 |
| 7,279,104 B2 * | 10/2007 | Keeton, Jr. | | 210/620 |
| 7,449,798 B2 * | 11/2008 | Suzuki et al. | | 307/65 |
| 7,733,679 B2 * | 6/2010 | Luger et al. | | 363/98 |
| 7,929,325 B2 * | 4/2011 | de Rooij et al. | | 363/71 |
| 8,313,038 B2 * | 11/2012 | Therrien et al. | | 236/49.2 |
| 2002/0149950 A1 * | 10/2002 | Takebayashi | | 363/16 |
| 2003/0002310 A1 * | 1/2003 | Madenokouji et al. | | 363/132 |
| 2004/0095091 A1 * | 5/2004 | McNulty et al. | | 320/101 |
| 2004/0154615 A1 * | 8/2004 | Komano et al. | | 126/629 |
| 2007/0030717 A1 * | 2/2007 | Luger et al. | | 363/132 |
| 2009/0085404 A1 * | 4/2009 | Suzuki et al. | | 307/46 |
| 2009/0296434 A1 * | 12/2009 | De Rooij et al. | | 363/71 |

\* cited by examiner

*Primary Examiner* — Charles Kasenge
(74) *Attorney, Agent, or Firm* — Matthias Scholl P.C.; Matthias Scholl

(57) ABSTRACT

A power supply control device including a power supply and a switching control system. The power supply includes a solar power supply unit and an electric network power supply unit. The solar power supply unit includes solar cells and a DC-DC boosting circuit; an output terminal of the solar cells is connected with an input terminal of the DC-DC boosting circuit and the output terminal of the DC-DC boosting circuit supplies power to the exterior. The electric network power supply unit includes an AC-DC rectifying circuit; an input terminal of the AC-DC rectifying circuit is connected to an electric network alternating current input and an output terminal thereof supplies power to the exterior. A ventilating device using the power supply device is also provided.

10 Claims, 3 Drawing Sheets

POWER SUPPLY CONTROL DEVICE AND VENTILATING DEVICE USING SAME

CROSS-REFERENCE TO RELATED APPLICATIONS

This application is a continuation of International Patent Application No. PCT/CN2010/070236 with an international filing date of Jan. 18, 2010, designating the United States, now pending, and further claims priority benefits to Chinese Patent Application No. 200920051892.2 filed Feb. 23, 2009. The contents of all of the aforementioned applications, including any intervening amendments thereto, are incorporated herein by reference.

BACKGROUND OF THE INVENTION

1. Field of the Invention

The invention relates to a power supply control device and a ventilating device using the same.

2. Description of the Related Art

Solar-powered motor control has developed rapidly in recent years. However, solar power technology has far from been widely introduced or directly used to drive motors.

Solar power has long been directly applied to drive blowers in the field of ventilating device technology, but with the following disadvantages: 1) there is certain limitation because blowers are controlled only by solar power with light intensity, light duration or light energy transmission intensity as major influential factors, and 2) blowers will completely stop working in the absence of the solar power. This cannot meet customer requirements for long-term operation or even causes huge economic loss.

SUMMARY OF THE INVENTION

It is one objective of the invention to provide a power supply control device, which is characterized in that it is energy efficient, environmentally friendly, simply, electricity cost effective, and safe & reliable power supply.

To achieve the above objective, in accordance with the invention, there provided is a power supply control device, comprising a power supply and a switching control system, wherein the power supply comprises a solar power supply unit and an electric network power supply unit; under normal circumstances, the solar power supply unit supplies power to the exterior, but when the solar power supply unit falls short of power supply because of insufficient light, the switching control system will access to the electric network power supply unit, which will then supply power to the exterior; the solar power supply unit comprises solar cells and a DC-DC boosting circuit; an output terminal of the solar cells is connected with an input terminal of the DC-DC boosting circuit and the output terminal of the DC-DC boosting circuit supplies power to the exterior; the electric network power supply unit comprises an AC-DC rectifying circuit; an input terminal of the AC-DC rectifying circuit is connected to an electric network alternating current input and an output terminal thereof supplies power to the exterior.

In a class of this embodiment, the switching control system comprises a detecting circuit, a controller, and a switching circuit. The controller may be a microprocessor. The switching circuit mainly comprises a switching element that connects to the output terminal of both the AC-DC rectifying circuit and the DC-DC boosting circuit. When the detecting circuit inputs a voltage signal detected from the solar power supply unit into the controller, the controller will then, according to voltage conditions output by the solar power supply unit, output a control signal to the switching circuit to control the opening and closing of the switching element to supply power to the exterior by connecting either the electric network power supply unit or the solar power supply unit.

In a class of this embodiment, the switching control system further comprises a real-time clock circuit. An output terminal of the real-time clock circuit is connected with an input terminal of the controller. The controller, according to the real-time clock time, output a control signal to the switching circuit to control the opening and closing of the switching element to supply power to the exterior by connecting either the electric network power supply unit or the solar power supply unit.

Advantages of the power supply control device are summarized below: 1) under normal circumstances, it is more energy efficient, environmentally-friendly and electricity cost effective; 2) when the solar power supply unit falls short of power supply because of insufficient light, the switching control system will access to the electric network power supply unit, which will supply power to the exterior safely and reliably; and 3) circuit structure is simple. The switching control system, solar power supply unit and electric network power supply unit have simple structure, easy implementation and low manufacturing costs.

It is another objective of this invention to provide a ventilating device, which is characterized in that it is cost effective, energy efficient, environmentally friendly, and safe & reliable power supply.

To achieve the above objective, in accordance with this invention, there provided is a ventilating device comprising a blower system and a power supply control device, wherein the power supply control device comprises a power supply and a switching control system; the power supply comprises a solar power supply unit and an electric network power supply unit; under normal circumstances, the solar power supply unit supplies power to the blower system, but when the solar power supply unit falls short of power supply because of insufficient light, the switching control system will access to the electric network power supply unit, which will then supply power to the blower system.; the solar power supply unit comprises solar cells and a DC-DC boosting circuit; an output terminal of the solar cells is connected with an input terminal of the DC-DC boosting circuit and the output terminal of the DC-DC boosting circuit supplies power to the blower system; the electric network power supply unit comprises an AC-DC rectifying circuit; an input terminal of the AC-DC rectifying circuit is connected to an electric network alternating current input and its output terminal supplies power to the blower system.

In a class of this embodiment, the switching control system comprises a detecting circuit, a controller, and a switching circuit. The controller may be a microprocessor. The switching circuit mainly comprises a switching element that connects to the output terminal of both the AC-DC rectifying circuit and the DC-DC boosting circuit. When the detecting circuit inputs a voltage signal detected from the solar power supply unit into the controller, the controller will then, according to voltage conditions output by the solar power supply unit, output a control signal to the switching circuit to control the opening and closing of the switching element to supply power to the blower system by connecting either the electric network power supply unit or the solar power supply unit.

In a class of this embodiment, the switching control system further comprises a real-time clock circuit. An output terminal of the real-time clock circuit is connected with an input terminal of the controller. The controller, according to the real-time clock time, output a control signal to the switching circuit to control the opening and closing of the switching element to supply power to the blower system by connecting either the electric network power supply unit or the solar power supply unit.

In a class of this embodiment, the controller can be a Micro Controller Unit (MCU) and the switching circuit can be a relay switching circuit.

In a class of this embodiment, the controller can be formed by both a Micro Controller Unit (MCU) and a photo-coupled drive circuit and the switching circuit can be a thyristor switch.

In a class of this embodiment, the controller can be connected to the blower system to both control the operation and receive operating status feedback of the blower system.

Advantages of the ventilating device of this invention are summarized below: 1) solar power and electric network power are combined, energy efficient, environmentally friendly, operating cost effective. Limitation problem on blower control by individual energy is solved; 2) solar power and electric network power can work independently. It is highly intelligent for the blower system to be controlled by switching over different control systems so as to supply power safely and reliably and meanwhile ensure long-term operation of the blower system.

DETAILED DESCRIPTION OF THE EMBODIMENTS

The invention is explained in further detail below with the reference to exemplary embodiments and attached drawings.

Example 1

Figure 1:
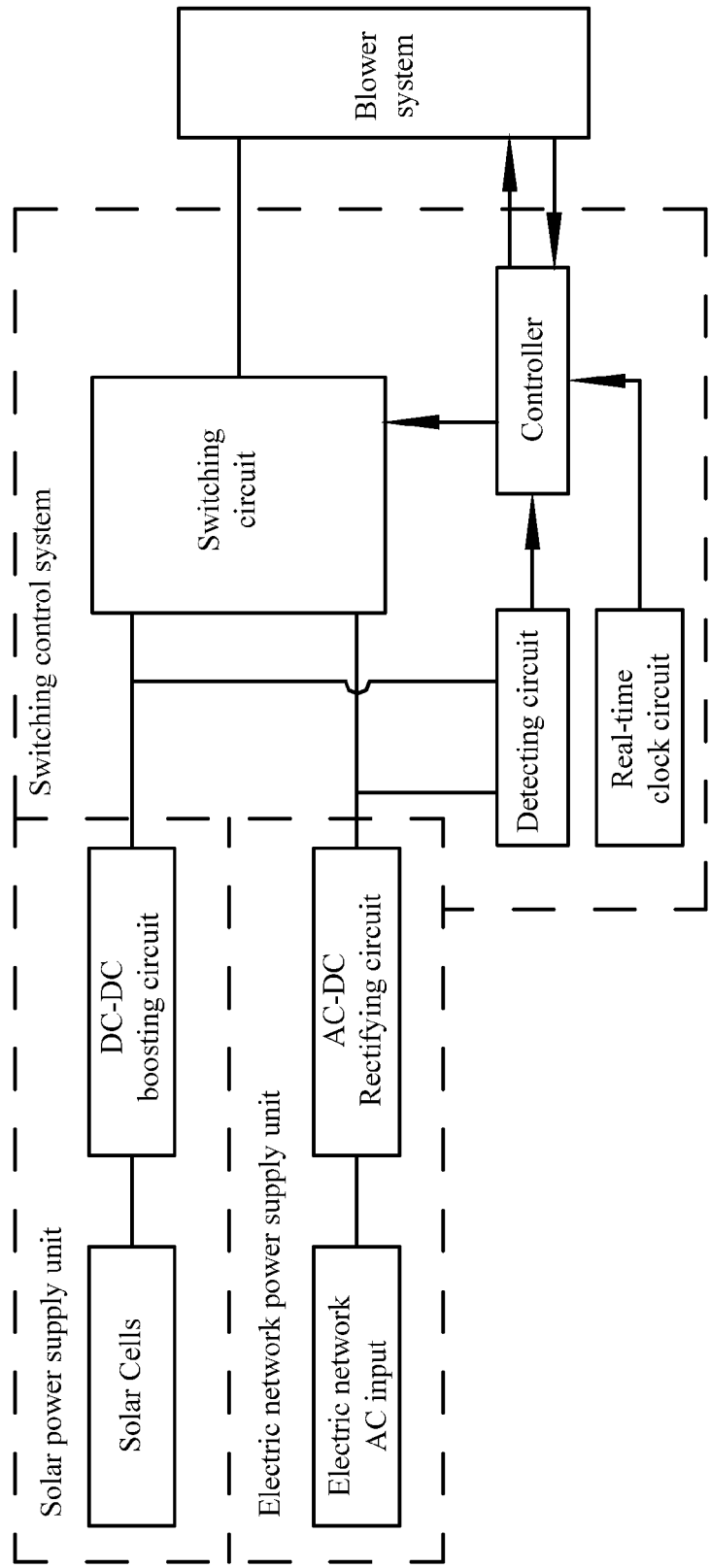
FIG. 1 is a circuit block diagram according to one embodiment of the invention.

As shown in FIG. 1, a ventilating device comprises a blower system and a power supply control device. The power supply control device comprises a power supply and a switching control system. The power supply comprises a solar power supply unit and an electric network power supply unit. Under normal circumstances, the solar power supply unit supplies power to the blower system, but when the solar power supply unit falls short of power supply because of insufficient light, the switching control system will access to the electric network power supply unit, which will then supply power to the blower system. The solar power supply unit comprises polar cells and a DC-DC boosting circuit. An output terminal of the solar cells is connected with an input terminal of the DC-DC boosting circuit and the output terminal of the DC-DC boosting circuit supplies power to the blower system. The electric network power supply unit comprises an AC-DC rectifying circuit. An input terminal of the AC-DC rectifying circuit is connected to an electric network alternating current input and its output terminal supplies power to the blower system.

The switching control system comprises a detecting circuit, a real-time clock circuit, a controller and a switching circuit. The controller may be a microprocessor. The switching circuit mainly comprises a switching element that connects to the output terminal of both the AC-DC rectifying circuit and the DC-DC boosting circuit. When the detecting circuit inputs a voltage signal detected from the solar power supply unit into the controller, the controller will then, according to the real-time clock time and voltage conditions output by the solar power supply unit, output a control signal to the switching circuit to control the opening and closing of the switching element so as to supply power to the blower system by gating either the electric network power supply unit or the solar power supply unit.

Figure 2:
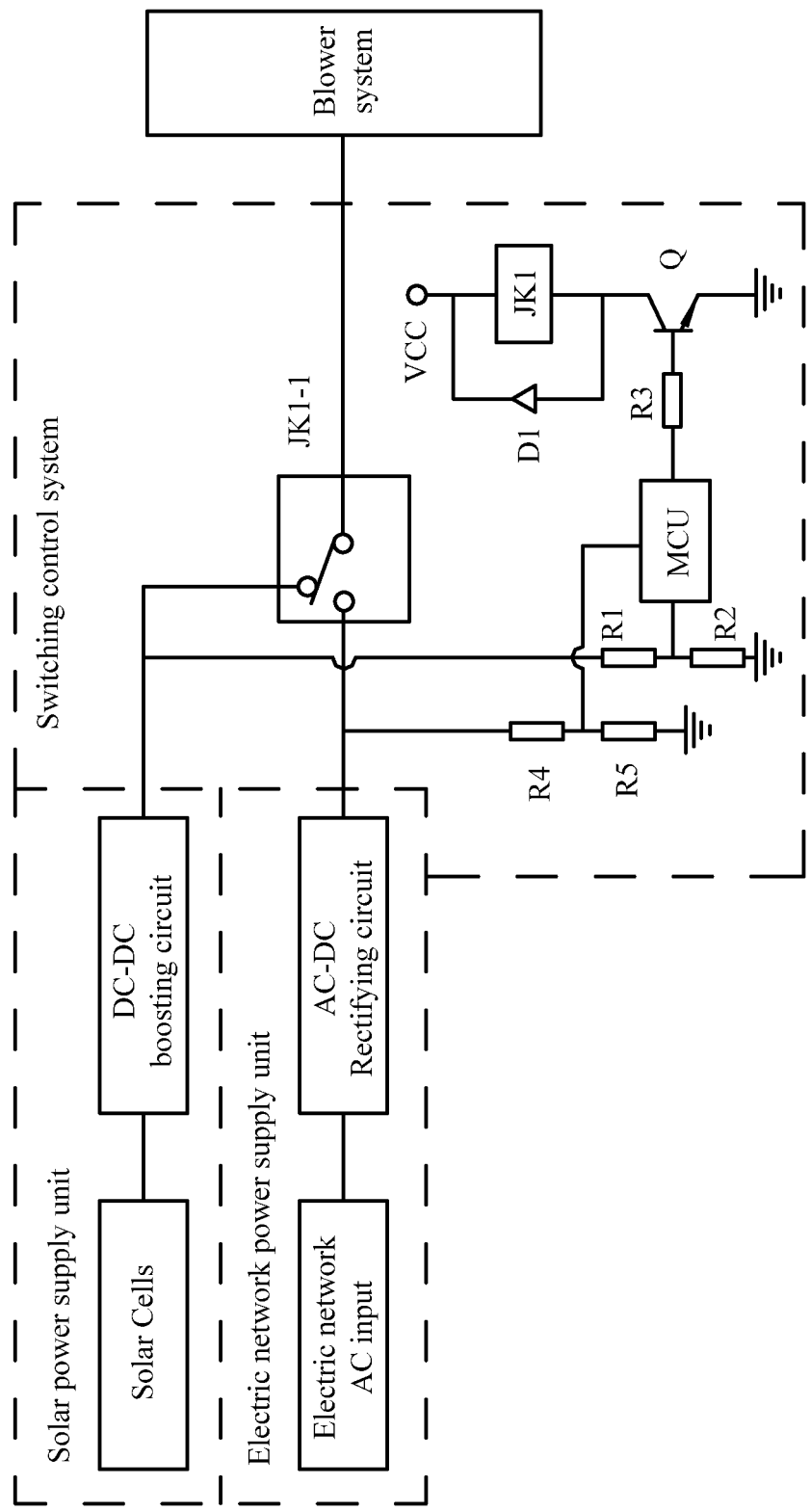
FIG. 2 is a circuit implementation diagram of FIG. 1 according to one embodiment of the invention.

As shown in FIG. 2, in accordance with the utility model invention, the controller can be a MCU. The detecting circuit is formed by a resistance R1 and R2 in series with one end connecting the ground and the other end connecting the output terminal of the solar cells. The DC-DC boosting circuit outputs 300V DC voltage. The output terminal of the detecting circuit is connected with input pins of the MCU. The switching circuit can be a relay switching circuit including a relay JK1, a resistance R3, a triode Q, and a diode D1. A controlled switch JK1-1 of the relay JK1 is respectively connected with an output terminal of the AC-DC rectifying circuit and the DC-DC boosting circuit. The controlled switch JK1-1 of the relay JK1 is a two-way interlock switch. Under normal circumstances, when the controlled switch JK1-1 is connected upwards, the solar power supply unit supplies power, but when the output terminal of the DC-DC boosting circuit is less than 300V, the detecting circuit will send signals to the MCU, whose output pin controls the relay JK1 to make the controlled switch JK1-1 connected downwards so as to enable the electric network power supply unit to output 300V DC voltage. In order to achieve a perfect control, the MCU can be connected with the blower system for communication. In case of the power supply switching, the MCU will firstly send signals to the blower system to stop it before the power supply is switched over. This is more safe and reliable. The blower system can also send control signals to the MCU. In addition, circuits can be monitored by the electric network voltage formed by a resistance R4 and R5 in series, more specifically, monitor the output terminal voltage of the AC-DC rectifying circuit, then the signal will be sent to the MCU to perform perfect control. For example, when the electric network is absent of power, the power supply will not be switched over.

Example 2

Figure 3:
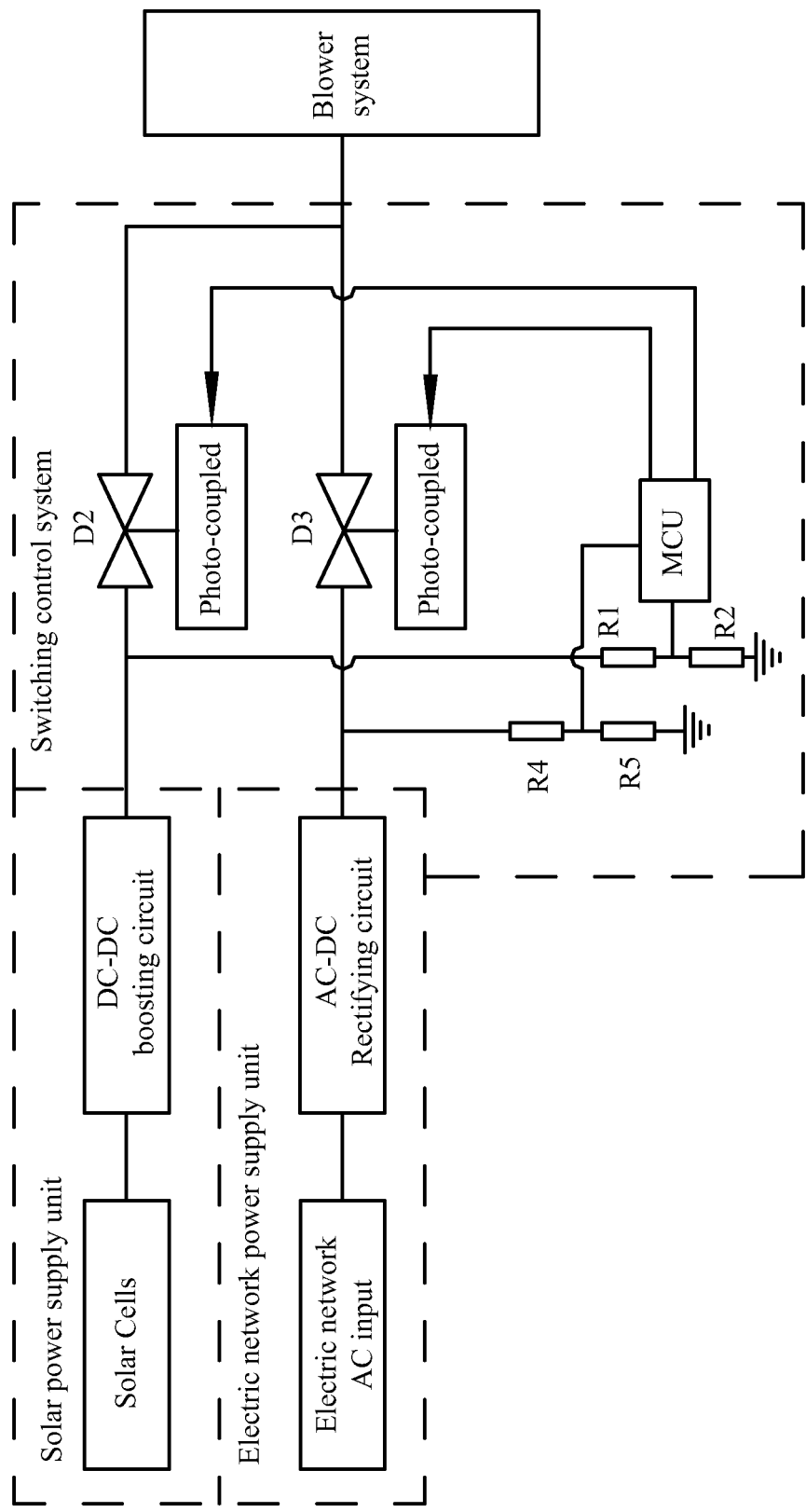
FIG. 3 is a circuit implementation diagram of FIG. 1 according to one embodiment of the invention.

As shown in FIG. 3, the controller in Example 1 is a MCU and the switching circuit comprises a photo-coupled and a thyristor switch D2 and D3.

Working principle according to the utility model invention: the solar power supply unit absorbs and stores solar power through the solar cells and outputs approx. 48V DC voltage, which will be converted into 300V DC voltage through the DC-DC boosting circuit; the utility network power supplied by the electric network power supply unit is converted into 300V DC voltage through the AC-DC rectifying circuit. The detecting circuit detects the DC voltage output from the solar power supply unit and transmits the detected voltage information to the controller. The controller automatically switch over the solar power supply unit and the electric network power supply unit to supply power to the blower system so as to drive and control the blower system by means of switching over on and off of the circuit. When DC voltage output by the solar power supply unit is less than 48V, the detecting circuit will transmit the detected voltage information to the controller, which will switch to the electric network power supply unit to supply the power by controlling on and off of the switching circuit. The power will be converted into 300V DC voltage through the AC-DC rectifying circuit to supply the blower system. When DC voltage output by the solar power supply unit is approx. 48V, the detecting circuit will transmit the voltage information to the controller, which will control the electric network power supply unit to stop supplying power and then switch to the solar power supply unit to supply power. The power will be converted into 300V DC voltage through the DC-DC boosting circuit to supply the blower system.

In addition, according to the utility model invention, the controller switches between the electric network power supply unit and the solar power supply unit based on time signals of the real-time clock circuit, whose function can also be fulfilled by related software. The real-time clock unit is a program of the controller. Using the real-time clock, the power can be supplied at 8 a.m. to 5 p.m. by the solar power supply unit, and the rest supplied by the electric network power supply unit. To make the controlment more practicable, a detection circuit can be employed to detect the DC voltage output from the solar power supply unit.

While particular embodiments of the invention have been shown and described, it will be obvious to those skilled in the art that changes and modifications may be made without departing from the invention in its broader aspects, and therefore, the aim 1n the appended claims is to cover all such changes and modifications as fall within the true spirit and scope of the invention.

The invention claimed is:

1. A power supply control device comprising a power supply and a switching control system;
   wherein:
      said power supply comprises a solar power supply unit and an electric network power supply unit;
      said solar power supply unit comprises a plurality of solar cells and a DC-DC boosting circuit;
      an output terminal of said plurality of solar cells is connected with an input terminal of said DC-DC boosting circuit and an output terminal of said DC-DC boosting circuit supplies power to an electric appliance;
      said electric network power supply unit comprises an AC-DC rectifying circuit and an electric network input;
      an input terminal of said AC-DC rectifying circuit is connected to said electric network input and an output terminal of said AC-DC rectifying circuit supplies power to the electric appliance;
      said switching control system comprises a detecting circuit, a controller, and an interlock switch;
      said detecting circuit comprises a first detecting element for detecting a voltage of said solar power supply unit and a second detecting element for detecting a voltage of said electric network power supply unit;
      said interlock switch comprises a first contact connected to the output terminal of said DC-DC boosting circuit, a second contact connected to the output terminal of said AC-DC rectifying circuit, and a third contact connected to said electric appliance;
      said controller is connected to said detecting circuit and to said interlock switch;
      said interlock switch is controlled by said controller to connect the first contact to the third contact when the voltage of said solar power supply unit reaches a first predetermined voltage or when the voltage of said electric network power supply unit is not at a second predetermined voltage; and
      said interlock switch is controlled by said controller to connect the second contact to the third contact when the voltage of said solar power supply unit is less than the first predetermined voltage and the voltage of said electric network power supply unit reaches the second predetermined voltage.

2. The power supply control device of claim 1, wherein said switching control system further comprises a real-time clock circuit; an output terminal of said real-time clock circuit is connected with an input terminal of said controller; said controller, according to said real-time clock time, controls said interlock switch to connect the first contact or the second contact to the third contact.

3. A ventilating device, comprising a blower system and a power supply control device;
   wherein:
      said power supply control device comprises a power supply and a switching control system;
      said power supply comprises a solar power supply unit and an electric network power supply unit;
      said solar power supply unit comprises a plurality of solar cells and a DC-DC boosting circuit;
      an output terminal of said plurality of solar cells is connected with an input terminal of said DC-DC boosting circuit and an output terminal of said DC-DC boosting circuit supplies power to said blower system;
      said electric network power supply unit comprises an AC-DC rectifying circuit and an electric network input;
      an input terminal of said AC-DC rectifying circuit is connected to said electric network input and an output terminal of said AC-DC rectifying circuit supplies power to said blower system;
      said switching control system comprises a detecting circuit, a controller, and an interlock switch;
      said detecting circuit comprises a first detecting element for detecting a voltage of said solar power supply unit and a second detecting element for detecting a voltage of said electric network power supply unit;
      said interlock switch comprises a first contact connected to the output terminal of said DC-DC boosting circuit, a second contact connected to the output terminal of said AC-DC rectifying circuit, and a third contact connected to said blower system;
      said controller is connected to said detecting circuit and to said interlock switch;
      said interlock switch is controlled by said controller to connect the first contact to the third contact when the voltage of said solar power supply unit reaches a first predetermined voltage or when the voltage of said electric network power supply unit is not at a second predetermined voltage; and
      said interlock switch is controlled by said controller to connect the second contact to the third contact when the voltage of said solar power supply unit is less than the first predetermined voltage and the voltage of said electric network power supply unit reaches the second predetermined voltage.

4. The ventilating device of claim 3, wherein said switching control system further comprises a real-time clock circuit; an output terminal of said real-time clock circuit is connected with an input terminal of said controller; said controller, according to said real-time clock time, controls said interlock switch to connect the first contact or the second contact to the third contact.

5. The ventilating device of claim 3, wherein said controller is a Micro Controller Unit and said switching circuit is a relay switching circuit.

6. The ventilating device of claim 4, wherein said controller is a Micro Controller Unit and said switching circuit is a relay switching circuit.

7. The ventilating device of claim 3, wherein said controller is formed by both a Micro Controller Unit and a photo-coupled drive circuit and said switching circuit is a thyristor switch.

8. The ventilating device of claim 4, wherein said controller is formed by both a Micro Controller Unit and a photo-coupled drive circuit and said switching circuit is a thyristor switch.

9. The ventilating device of claim 3, wherein said controller is connected to said blower system to both control the operation and receive operating status feedback of said blower system.

10. The ventilating device of claim 4, wherein said controller is connected to said blower system to both control the operation and receive operating status feedback of said blower system.

* * * * *